US005988206A

United States Patent [19]

Bare et al.

[11] Patent Number: 5,988,206

[45] Date of Patent: Nov. 23, 1999

[54] APPARATUS AND METHOD FOR TESTING LEAKS

[75] Inventors: Eric Bare, Dublin; Joe Henry, West Liberty; Lorne Quay, Huntsville, all of Ohio

[73] Assignee: Honda of America Mfg., Inc., Marysville, Ohio

[21] Appl. No.: 09/041,402

[22] Filed: Mar. 12, 1998

[51] Int. Cl.[6] .............................. F02B 43/00; F16K 24/00

[52] U.S. Cl. .......................... 137/354; 137/588; 137/597; 123/527; 73/46

[58] Field of Search .................................... 137/351, 354, 137/588, 597, 899; 123/527, 528, 529; 73/46

[56] References Cited

U.S. PATENT DOCUMENTS

| | | | |
|---|---|---|---|
| 4,523,548 | 6/1985 | Engel et al. | 123/527 X |
| 5,237,981 | 8/1993 | Polletta et al. | 123/527 |
| 5,330,031 | 7/1994 | Hill et al. | 123/527 X |
| 5,474,104 | 12/1995 | Borland et al. | 137/351 X |
| 5,488,970 | 2/1996 | Cippitani | 137/351 |
| 5,522,369 | 6/1996 | Povinger | 123/527 |
| 5,529,089 | 6/1996 | Hicks et al. | 137/588 X |
| 5,611,316 | 3/1997 | Oshima et al. | 123/529 X |
| 5,632,250 | 5/1997 | Kato et al. | 123/490 |
| 5,701,928 | 12/1997 | Aoki | 123/529 X |
| 5,785,082 | 7/1998 | Geis et al. | 137/516.29 |
| 5,794,979 | 8/1998 | Kasuga et al. | 280/834 |
| 5,829,418 | 11/1998 | Tamura et al. | 123/529 |

*Primary Examiner*—John Rivell
*Attorney, Agent, or Firm*—Pearne, Gordon, McCoy & Granger LLP

[57] ABSTRACT

A method and apparatus for testing leaks in a compressed natural gas fuel system on an assembly line. The apparatus includes a filling receptacle, a filling conduit, a fuel tank assembly, a supply conduit, a pressure regulating assembly, and a joint box. The filling conduit extends between the filling receptacle and the fuel tank assembly. The supply conduit extends between the fuel tank assembly and the pressure regulating assembly. The joint box includes a valve which regulates fluid communication between the filling conduit and the supply conduit. In the method according to the present invention, the tank assembly is fluidly isolated from the remainder of the fuel system and the filling conduit and supply conduit are fluidly connected, by opening the joint box valve, to permit pressurization and leak detection of a first portion of the fuel system. Thereafter, the joint box valve is closed to isolate the filling conduit from the supply conduit, and the pressure regulating assembly is activated to pressurize a second portion of the fuel system for leak detection purposes.

20 Claims, 3 Drawing Sheets

LOW PRESSURE LEAK CHECK
120
OK
PRESSURIZE SYSTEM
122
OK
UNDER BODY LEAK CHECK
124
OK
CLOSE JOINT BOX VALVE
126
OK
CONNECT FUEL FEED HOSE
128
OK
ACTIVATE PRESS. REG. SOLENOID
130
OK
UPPER BODY LEAK CHECK
132
OK
136
TAG CAR FOR REPAIR
140'
TO FURTHER ASSEMBLY
142
REPAIR
144
CHARGE SYSTEM WITH CNG
138
CHARGE SYSTEM WITH CNG
140
TO FURTHER ASSEMBLY

APPARATUS AND METHOD FOR TESTING LEAKS

BACKGROUND OF THE INVENTION

The present invention relates generally to leak testing apparatuses and methods and, more particularly, to a leak testing apparatus and method related to manufacture of compressed natural gas automobiles.

One of the problems associated with manufacture of compressed natural gas or CNG automobiles has been in the testing of the fuel system for leaks during the assembly process without unnecessary delay of the assembly line. The problems created by testing for fuel system leaks is that such testing, in the past, has been a relatively time-consuming process that was not capable of being accomplished in the time allotted on an automated assembly line. Accordingly, attempts in the past to provide a CNG mass-produced automobile have not been favorably received.

With reference to FIG. 1, a prior art leak testing apparatus and method is schematically illustrated. As shown in FIG. 1, a filling conduit 12 extends from a filling receptacle 14 to the input port of a CNG tank 16. A manual input valve is provided at the CNG input port and a manual output valve is provided at an output port of the CNG tank 16. A supply conduit 18 extends from the CNG tank output valve to a fuel pressure regulator assembly 20. From the fuel pressure regulator assembly 20 a fuel feed line (not shown) extends to a fuel rail (not shown) which communicates with a series of CNG injectors. Each of the joints or connections in the fuel system must be checked for leaks prior to the automobile leaving the factory and preferably, during the assembly process. However, in the past the fuel system leak checking was done in a single step and required about 15 minutes to accomplish a full check of the fuel system. Moreover, the prior art leak checking method required pressurization of the CNG tank 16, which is wasteful of pressurizing fluid and time consuming.

The prior art method for testing leaks in the fuel system requires pressurization of the entire system by injecting pressurizing fluid via the filling receptacle 14 and filling conduit 12. Once the system, at least to the pressure regulator assembly 20, was pressurized, the tank output valve could be closed and sensors could be used to sense leakage of pressurizing fluid. Thereafter, the pressure regulator assembly 20 could be activated to introduce pressurized gas into the fuel feed line and the fuel rail, and further sensing for leakage of pressurizing fluid would occur. As stated previously, pressurizing and sensing of the fuel system typically required 15 minutes, whereas, in modern assembly lines, each step the process is given a certain time period, for example 60 seconds. Accordingly, the known leak sensing method and apparatus is incompatible and not useful on modern assembly lines.

Accordingly, there exists a need in the art for a method and apparatus for testing leaks in CNG fuel systems for automobiles which can be performed quickly and reliably. Moreover, there exists a need in the art for a CNG leak testing method and apparatus that can be incorporated into an automobile assembly line.

SUMMARY OF THE INVENTION

The present invention is directed toward a method and apparatus for testing for leaks in CNG fuel systems for automobiles quickly and reliably, and which can be accomplished on an automobile assembly line. In accordance with the present invention, a leak testing apparatus which is incorporated into an automobile and used during assembly of the automobile to facilitate testing for leaks in the fuel system remain in the automobile following assembly and transparent to operation of the fuel system during use.

A fuel system according to the present invention includes a filling receptacle, a fuel tank assembly adapted to receive and store compressed natural gas, a filling conduit fluidly connecting the filling receptacle to the fuel tank assembly, a pressure regulating assembly, a supply conduit fluidly connecting the fuel tank assembly to the pressure regulating assembly, and a bypass operable to provide direct fluid communication between the filling conduit and the supply conduit.

In further accordance with the present invention, the bypass includes a joint box, the filling conduit includes a first portion extending from the filling receptacle to the joint box and a second portion extending from the joint box to the tank assembly, the supply conduit comprises a first portion extending from the tank assembly to the joint box and a second portion extending from the joint box to the pressure regulating assembly. The joint box defines a first passageway connecting the filling conduit first and second portions, a second passageway connecting the supply conduit first and second portions, and a linking passageway interconnecting the first and second passageways. The joint box also includes a manual valve which is operable to control fluid flow through the linking passageway.

The method for testing for leaks according to the present invention includes the steps of fluidly isolating the fuel tank from the filling conduit and the supply conduit, fluidly connecting the filling conduit to the supply conduit, introducing a pressurizing gas into a first portion of the fuel system, sensing pressure in the first portion of the fuel system, monitoring the sensed pressure for a predetermined period of time, detecting the presence of pressurizing fluid at locations adjacent the first portion of the fuel system, and fluidly isolating the filling conduit from the supply conduit.

The present invention is also directed toward an automobile incorporating a compressed natural gas fuel system. In accordance with the present invention, the automobile defines an engine compartment and a tank compartment. The tank compartment is delimited by a bottom wall which has an opening which receives a joint box. The fuel system includes, in addition to the joint box, a filling assembly, a tank assembly, a supply conduit, and a pressure regulating assembly.

In further accordance with the present invention, the joint box has a first side communicating with the tank compartment and a second side communicating with an exterior of the automobile. The filling conduit has a first portion extending from the filling receptacle to the first side of the joint box and a second portion extending from the second side of the joint box to the tank assembly. The supply conduit has a first portion extending from the tank assembly to the second side of the joint box and a second portion extending from the first side of the joint box to the pressure regulating assembly. The joint box includes a manually operated valve which, when open, directly connects the filling conduit to the supply conduit. The manual joint box valve is provided on the first side of the joint box and is accessible from an exterior of the automobile.

BRIEF DESCRIPTION OF THE DRAWINGS

These and further features of the present invention will be apparent with reference to the following description and drawings, wherein.

DETAILED DESCRIPTION OF THE PREFERRED EMBODIMENT

Figure 1:
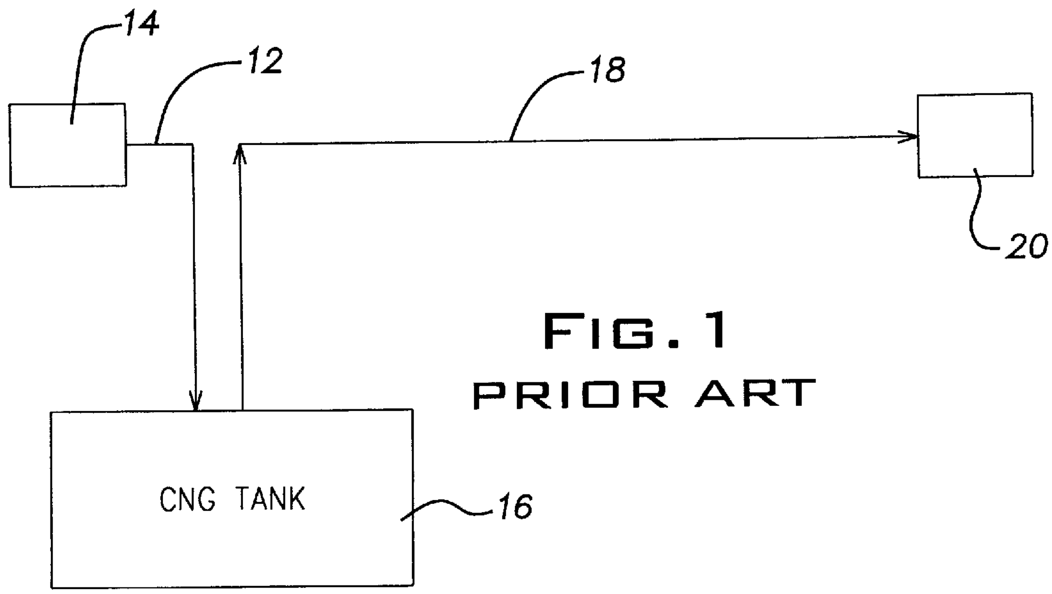
FIG. 1 schematically illustrates a prior art leak detection method and apparatus.
Figure 2:
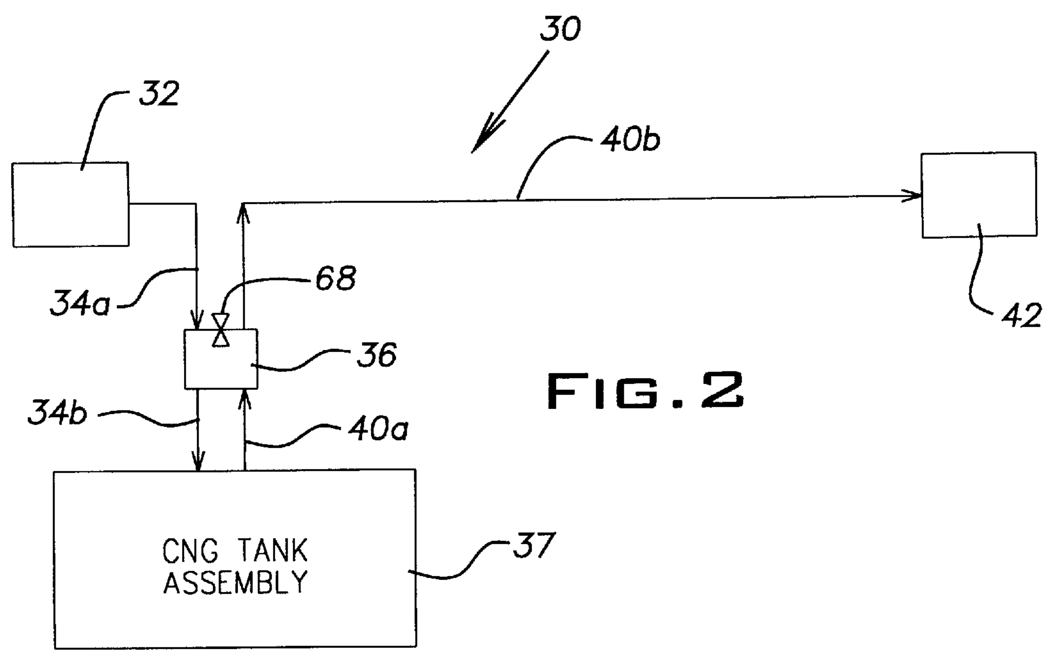
FIG. 2 schematically illustrates a leak detection method and apparatus according to present invention.
Figure 3:
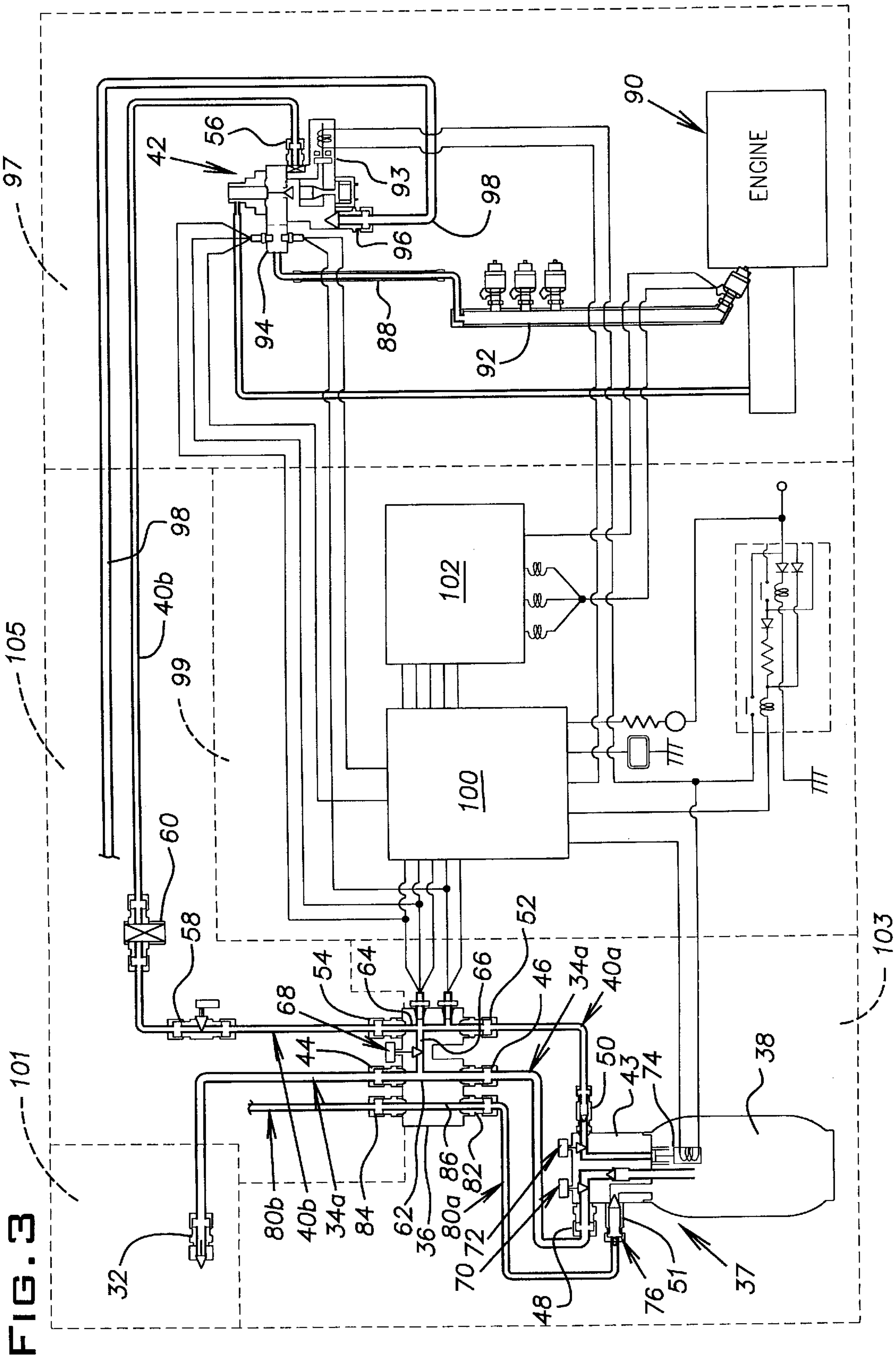
FIG. 3 schematically illustrates a CNG fuel system according to the present invention; and, FIG. 4 is a flow chart illustrating the method steps according to the present invention.

With reference to FIGS. 2–3, a fuel system 30 according to the present invention generally includes a filling receptacle 32, a filling conduit 34*a*, 34*b*, a bypass or joint box 36, a CNG fuel tank assembly 37, a supply conduit 40*a*, 40*b*, and a pressure regulating assembly 42. The fuel tank assembly 37 includes a CNG fuel tank 38 and a multi-port valving assembly 43. The CNG tank 38 is preferably generally cylindrical in shape, and has the valving assembly 43 secured to an open end thereof, as illustrated in FIG. 3.

The filling conduit includes a first portion 34*a* which extends from the filling receptacle 32 to a first port 44 of the joint box 36 and a second portion 34*b* which extends from a second port 46 of the joint box 36 to an input port 48 of the valving assembly 43.

The supply conduit includes a first portion 40*a* which extends from an output port 50 of the valving assembly 43 to a third port 52 of the joint box 36 and a second portion 40*b* which extends from a fourth port 54 of the joint box 36 to an input port 56 of the pressure regulating assembly 42. A manual shut-off valve 58 and fuel filter 60 are provided in the second portion 40*b* of the supply conduit between the joint box 36 and the pressure regulating assembly 42.

The joint box 36 serves as a bypass to provide direct fluid communication between the filling conduit and the supply conduit, as will be apparent from the following description. The joint box 36 defines a first passageway 62 interconnecting the first and second joint box ports 44, 46 and a second passageway 64 interconnecting the third and fourth joint box ports 52, 54. A cross or linking passageway 66 in the joint box 36 fluidly interconnects the first and second passageways 62, 64. A manual lock-down valve 68 regulates fluid communication between the first and second passageways 62, 64 via the linking passageway 66, and thereby provides selective fluid communication between the filling conduit 34*a*, 34*b* and the supply conduit 40*a*, 40*b*, as will be described more fully hereinafter.

The valving assembly 43 of the CNG tank 38 includes a manual inlet valve 70 at the input port 48, a manual outlet valve 72 at the output port 50, a solenoid valve 74 (preferably disposed within the tank 38), and a relief valve 76. The relief valve 76 is disposed in a relief valve port 51 formed in the valving assembly 43. Individual passageways are defined in the valving assembly 43 and extend from the input port 48, output port 50, and relief valve port 51 to the interior of the fuel tank 38, as illustrated. The inlet and outlet valves 70, 72 are manually operable, and are useful to fluidly connect or disconnect the CNG tank 38 from the remainder of fuel system for installation, maintenance, and leak checking purposes. The solenoid valve 74 is normally closed, and is opened to admit gas into the supply conduit 40*a*, 40*b*, as will be apparent from the discussion to follow.

The pressure relief valve 76 is operable to automatically release gas from the CNG tank 38 should an over-pressure condition exist therein. The relief valve 76 has a relief conduit 80*a*, 80*b* extending therefrom which vents gas to atmosphere. The relief conduit preferably has a first portion 80*a* extending from the relief valve 76 to a fifth port 82 of the joint box 36 and a second portion 80*b* extending from a sixth port 84 of the joint box 36. The relief conduit second portion 80*b* has an open distal end disposed beneath the automobile and serving as a vent opening. A third passageway 86 defined in the joint box 36 extends between the fifth and sixth ports 82, 84, as illustrated.

The pressure regulating assembly 42 is disposed in an engine compartment 97 with an engine fuel feed hose 88, engine 90, and fuel rail 92. As will be apparent to one skilled in the art, the pressure regulating assembly 42, in addition to the input port 56 which is connected to the second portion 40*b* of the fuel supply conduit, has a solenoid valve 93, an output port 94 connected to the fuel feed hose 88, a pressure relief valve 96, in addition to other fluid and sensor connections. Similar to the CNG tank pressure relief valve 76, the pressure regulating assembly relief valve 96 vents gas to atmosphere via a vent conduit 98 in response to an over-pressure condition developed in the pressure regulating assembly 42.

In a cabin compartment 99 of the automobile, an electronic control unit (ECU) 100 and injection driver circuitry 102 are provided. The ECU 100 is operable to open/close the tank solenoid valve 74 and regulating assembly solenoid valve 93 in response to sensed operating conditions, such as pressure and temperature, existing in the fuel system 30. Various indicators, such as a fuel meter and low fuel level warning light, are provided in the cabin compartment, and are electrically connected to, and actuated by, the ECU 100 and/or injection driver 102.

The filling receptacle 32 is disposed within a small compartment 101 that is accessible from an exterior of the automobile and preferably covered by a fuel filler lid (not shown). The CNG tank 38 and the joint box 36 are disposed within a tank compartment 103 inside the automobile. The tank compartment 103 is preferably between a forward wall of the trunk and a rear seat of the automobile.

The joint box 36 preferably extends through an opening in a lower wall of the automobile which serves as a bottom of the tank compartment 103, and is at least partially accessible from the underside 105 of the automobile. More specifically, the first, fourth, and sixth ports 44, 54, 84 and the manual lock down valve 68 are on a first side of the joint box 36 which is accessible from the exterior or underside 105 of the automobile while the second, third and fifth ports 46, 52, 82 are on a second side of the joint box 36 which is accessible from the tank compartment 103. The manual shut-off valve 58 and fuel filter 60 are disposed in the second portion 40*b* of the supply conduit and located on the underside 105 of the automobile.

As noted previously, the first portion 40*a* of the fuel supply conduit extends from the CNG tank 38 in the tank compartment 103 to the joint box 36, which communicates with the underside 105 of the automobile. The second portion 40*b* of the fuel supply conduit extends from the fourth port 54 of the joint box 36 at the underside 105 of the automobile and extends into the engine compartment 97.

Prior to sensing for leaks in the fuel system 30, the various fuel system components are assembled and connected as described hereinbefore, with the below-noted exceptions. The joint box manual shut off valve 68 is initially open to permit fluid communication between the filling and supply conduits. The manual CNG tank inlet and outlet valves 70, 72 are closed to prevent introduction of pressurizing gas into the CNG tank 38. The manual shut off valve 58 is open. The fuel feed hose 88 is preferably not yet installed between the pressure regulating assembly 42 and the fuel rail 92.

Figure 4:
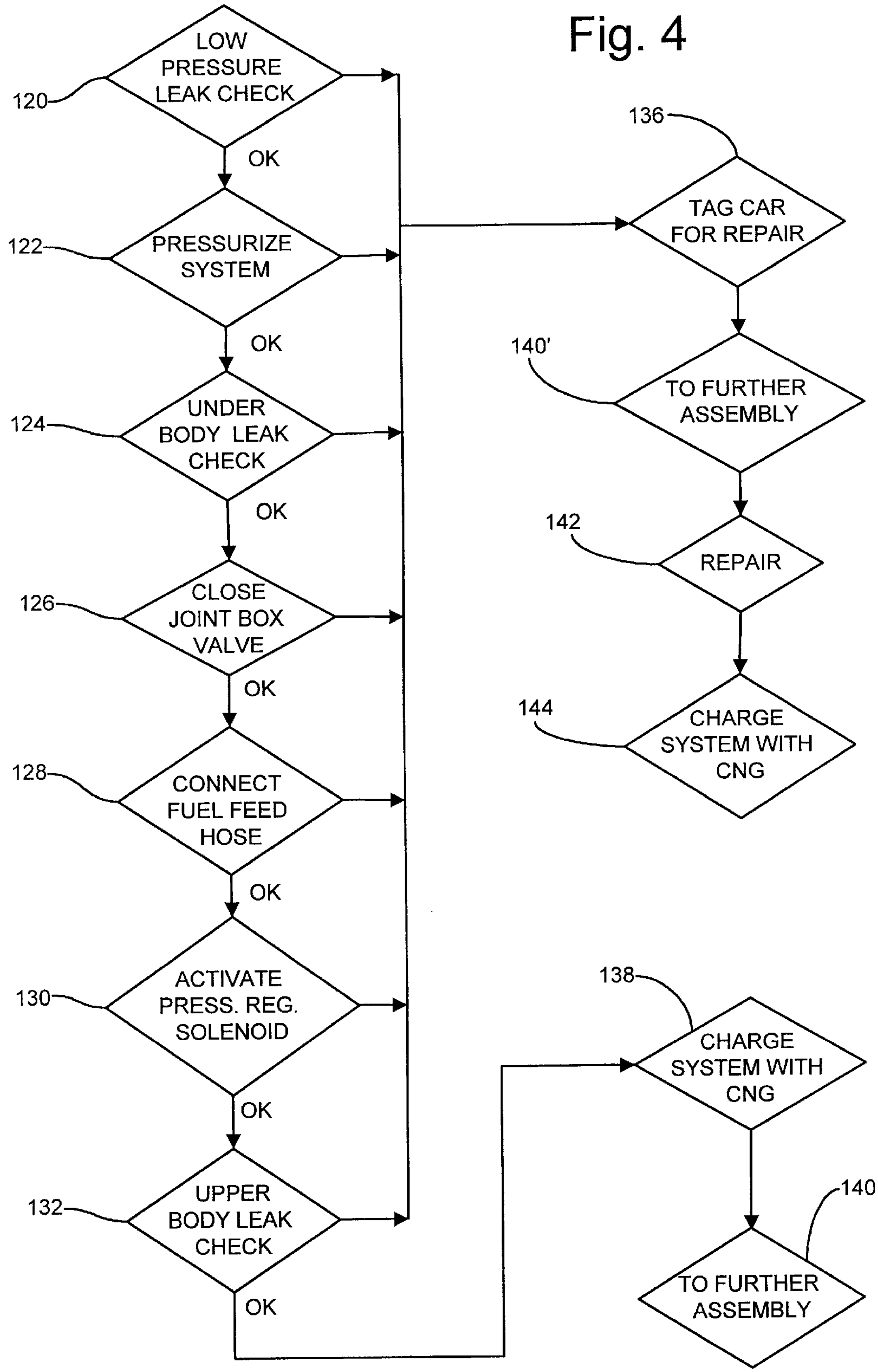

With reference to FIG. 4, the preferred sequence for checking for leaks in the CNG fuel system according to the present invention is illustrated. Initially, a low pressure test 120 is conducted by introducing a pressurizing gas (preferably helium) at a low pressure into the system to determined if large leaks are present prior to introduction of pressurizing the system at more elevated pressure levels. During the low pressure test, the system pressure is monitored for a period of time and, if there is no drop in sensed pressure, it is determined that no large leaks are present and the automobile advances to the next step.

In the next step 122, gas at an elevated pressure is introduced into the fuel system to test for small leaks in the fuel system. The pressurizing gas is preferably helium, and the system is preferably pressurized at between about 3000 to 4000 psi, with 3600 psi being found to be satisfactory. A helium detector or "sniffer" is used to check for small leaks at the fuel filling receptacle 32, joint box 36, manual shut-off valve 58, and filter 60. This test is referred to as the "under body test" 124 as each of the components being tested is located outside of the interior compartments of the automobile. Assuming no leaks are detected during the under body test, the automobile advances to the next step 126.

The manual joint box valve 68 is closed (step 126) to isolate or fluidly disconnect the filling conduit from the supply conduit. The fuel feed hose 88 is connected from the output port 94 of the pressure regulating assembly 42 to the fuel rail 92 (step 128). DC power is used to activate the pressure regulator solenoid valve 93 thereby allowing the pressurizing gas in the supply conduit to flow through the pressure regulating assembly 42 and then into the fuel feed hose 88 and fuel rail 92 (step 130). An "upper body leak" check 132 is thereafter performed. In the upper body leak check, like the under body leak check previously described, a helium detector or "sniffer" is used to check for leaks at the pressure regulator 42, fuel feed hose 88, and CNG tank 38.

If the fuel system passes all of the detection tests, the tank inlet and outlet valves 70, 72 are opened and the fuel system is filled or charged with compressed natural gas (step 138) and the assembly process continues 140. If the fuel system fails any of the steps in the leak detection process, the automobile is tagged (step 136) and, the assembly process continues (step 140'). At the end of the assembly process, previously tagged automobiles are removed to a separate repair location (step 142) wherein the cause of the leak is diagnosed and repaired. Thereafter, the fuel systems of the repaired automobiles are charged with compressed natural gas (step 144).

In constructing a working embodiment of the present invention described hereinbefore, a pressure comparison unit supplied by Phase 1 Instruments of Dayton, Ohio was found to work satisfactorily to monitor the fuel system for pressure drops indicative of leaks. The pressure comparison unit introduces pressurized gas into the fuel system and monitors the system for pressure drops. In one preferred embodiment, the pressure is monitored for about twenty-five seconds and a pressure drop of 4 psi is indicative of a system leak. If such a pressure drop is not detected within this predetermined time period, the unit indicates that the fuel system is good.

Also, a helium detector or "sniffer" supplied by Varian Vacuum Products of Lexington, Massachusetts, and identified as the Varian 990 CLD Auto-Line Helium Leak Detector was found to work satisfactorily in sensing the presence of leaks in the fuel system. The wand provided by the Varian detector draws air into a detector unit wherein the presence of helium may be determined. The wand is simply waved over the area of interest, such as the various joints and connections in the fuel system, and a sample of air is drawn into the detector unit. Preferably, the detector unit has a high sensitivity and quick response or sample time to speed the detection process.

While the preferred embodiment of the present invention is shown and described herein, it is to be understood that the same is not so limited but shall cover and include any and all modifications thereof which fall within the purview of the invention. For example, it is contemplated that one skilled in the art may modify the specific structure of the preferred embodiment of the present invention described herein by incorporating the bypass function of the joint box into the valving assembly, and thereby simultaneously connecting the valving assembly input and output ports while blocking communication from the input and output to the tank interior. Moreover, it is contemplated that pressurizing gases other than helium could be used.

What is claimed is:

1. A fuel system for an automobile, comprising:

a filling receptacle;

a fuel tank assembly adapted to receive and store compressed natural gas;

a filling conduit fluidly connecting said filling receptacle to said fuel tank assembly;

a pressure regulating assembly;

a supply conduit fluidly connecting said fuel tank assembly to said pressure regulating assembly; and, a bypass operable to provide fluid communication between said filling conduit and said supply conduit.

2. A fuel system according to claim 1, wherein said fuel tank assembly comprises a compressed natural gas tank and a valving assembly.

3. A fuel system according to claim 2, wherein said valving assembly includes an input connected to said filling conduit and an output connected to said supply conduit.

4. A fuel system according to claim 3, wherein said valving assembly further comprises a manual inlet valve at the input and a manual outlet valve at the output.

5. A fuel system according to claim 3, wherein said tank assembly further comprises a solenoid valve disposed within said tank and operable to control flow through said valving assembly output.

6. A fuel system according to claim 3, wherein said valving assembly further comprises a relief valve operable to vent gas from said tank should pressure within said tank exceed a predetermined level.

7. A fuel system according to claim 1, wherein said bypass comprises a joint box, said filling conduit includes a first portion extending from said filling receptacle to said joint box and a second portion extending from said joint box to said tank assembly, said supply conduit comprises a first portion extending from said tank assembly to said joint box and a second portion extending from said joint box to said pressure regulating assembly, said joint box defining a first passageway connecting said filling conduit first and second portions, a second passageway connecting said supply conduit first and second portions, and a linking passageway interconnecting said first and second passageways.

8. A fuel system according to claim 7, wherein said joint box further comprises a manual valve, said valve being operable to control fluid flow through said linking passageway.

9. A fuel system according to claim 8, wherein said tank assembly includes a compressed natural gas tank and a valving assembly, said valving assembly including an input fluidly connected to said filling conduit second portion and an output fluidly connected to said supply conduit first portion.

10. A fuel system according to claim 9, wherein said valving assembly further comprises a manual inlet valve at the input and a manual outlet valve at the output, and a solenoid valve, said solenoid valve being disposed within said tank and being operable to control fluid flow through said valving assembly output.

11. A method for testing for leaks in an automobile fuel system, said fuel system comprising a filling receptacle, a fuel tank assembly including a fuel tank adapted to receive and store compressed natural gas, a pressure regulating assembly, a filling conduit fluidly connecting said filling receptacle to said fuel tank assembly, a supply conduit fluidly connecting said fuel tank assembly to said pressure regulating assembly, said method comprising the steps of:

fluidly isolating said fuel tank from said filling conduit and said supply conduit;

fluidly connecting said filling conduit to said supply conduit;

introducing a pressurizing gas into a first portion of said fuel system;

sensing pressure in said first portion of said fuel system;

monitoring the sensed pressure for a predetermined period of time;

detecting the presence of pressurizing fluid at locations adjacent said first portion of said fuel system; and, fluidly isolating said filling conduit from said supply conduit.

12. A method for testing for leaks according to claim 11, comprising the further steps of:

actuating said pressure regulating assembly to introduce pressurizing fluid into a second portion of said fuel system;

detecting the presence of pressurizing fluid at locations adjacent said second portion of said fuel system.

13. A method for testing for leaks according to claim 11, wherein said fuel system further includes a joint box which defines a passageway which interconnects said filling conduit with said supply conduit, said joint box including a valve which is operable to regulate fluid flow through said passageway, and wherein said step of fluidly connecting said filling conduit to said supply conduit comprises opening said joint box valve and said step of fluidly isolating said filling conduit from said supply conduit comprises closing said joint box valve.

14. A method for testing for leaks according to claim 11, wherein said fuel tank assembly includes an inlet valve regulating fluid communication between said filling conduit and said fuel tank and a manual outlet valve regulating fluid communication between said fuel tank and said supply conduit, and wherein said step of fluidly isolating said fuel tank from said filling conduit and said supply conduit comprises closing said inlet valve and said outlet valve.

15. A method for testing for leaks according to claim 12, wherein said first portion of said fuel system is on an exterior of said automobile and said second portion of said fuel system is in an interior of said automobile.

16. An automobile having a compressed natural gas fuel system, said automobile defining an engine compartment and a tank compartment, said tank compartment having a bottom wall, said fuel system comprising a filling receptacle, a fuel tank assembly disposed within said tank compartment and adapted to receive and store compressed natural gas, a pressure regulating assembly disposed within said engine compartment, a filling conduit fluidly connecting said filling receptacle to said fuel tank assembly, a supply conduit fluidly connecting said fuel tank assembly to said pressure regulating assembly, and a bypass operable to provide fluid communication between said filling conduit and said supply conduit.

17. An automobile according to claim 16, wherein said bypass comprises a joint box disposed within an opening in said bottom wall and having a first side communicating with an exterior of said automobile and a second side communicating with said tank compartment, wherein said filling conduit has a first portion which extends between said filling receptacle and said joint box first side and a second portion which extends between said joint box second side and said tank assembly, and said supply conduit has a first portion which extends between said tank assembly and said joint box second side and a second portion which extends between said joint box first side and said pressure regulating assembly.

18. An automobile according to claim 17, wherein said joint box defines a first passageway connecting said filling conduit first and second portions, a second passageway connecting said supply conduit first and second portions, and a linking passageway interconnecting said first and second passageways, said joint box including a manual valve which is accessible from the exterior of the automobile, said valve being operable to regulate fluid flow through said linking passageway.

19. An automobile according to claim 18, wherein said fuel tank assembly comprises a compressed natural gas tank and a valving assembly, said valving assembly including an input fluidly connected to said filling conduit second portion, a manual inlet valve at the input, an output fluidly connected to said supply conduit first portion, an outlet valve at the output, and a solenoid valve, said solenoid valve being disposed within said tank and being operable to control fluid flow through said valving assembly output.

20. An automobile according to claim 19, wherein said valving assembly further comprises a relief valve operable to vent gas from said tank should pressure within said tank exceed a predetermined level.

* * * * *